March 8, 1966  T. R. BRUNSON ETAL  3,238,619
ARCH WIRE LOCKING DEVICE FOR ORTHODONTIC BRACKET
Original Filed March 13, 1961
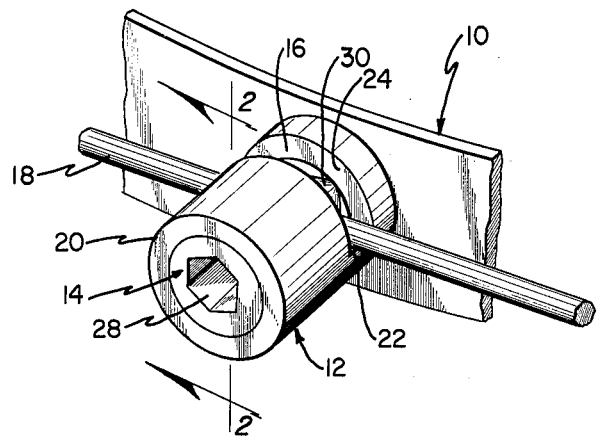
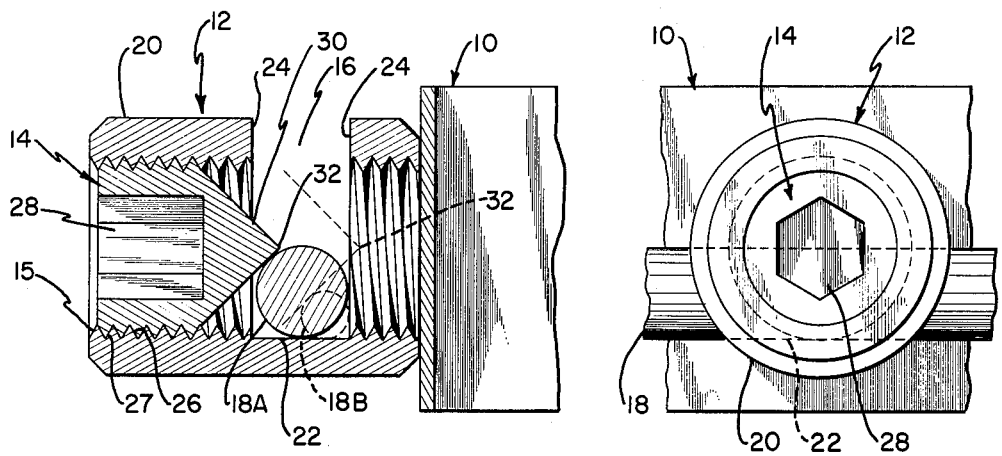
INVENTORS
THAYER R. BRUNSON
HAROLD G. DAVIS
BY
*Philip H. Sheridan*
ATTORNEY

United States Patent Office 3,238,619
Patented Mar. 8, 1966

3,238,619
ARCH WIRE LOCKING DEVICE FOR
ORTHODONTIC BRACKET
Thayer R. Brunson, Wheat Ridge, and Harold G. Davis, Denver, Colo., assignors to Rocky Mountain Dental Products Co., a corporation of Colorado
Continuation of application Ser. No. 95,145, Mar. 13, 1961. This application Apr. 29, 1963, Ser. No. 276,657
2 Claims. (Cl. 32—14)

This application is a continuation of copending U.S. patent application Serial No. 95,145, now abandoned, filed March 13, 1961, under the same title as this application.

This invention relates to orthodontic appliances, specifically bracket members, and is more particularly related to an arch wire locking device forming a part of an orthodontic bracket.

Various types of locking devices are now in use for locking arch wires and similar elements in place in an orthodontic bracket. In fact, it is customary to provide as a part of orthodontic brackets, a threaded screw member which is adjustable to hold an arch wire in locked disposition thereon, and specifically whereby the locking screw is threadedly movable across the arch wire receiving slot in the bracket to engage the arch wire and hold it against accidental release, slippage or loosening.

The present invention has as a primary feature a novel and improved type of locking screw which in cooperation with the relative disposition between the arch wire receiving slot and screw receiving opening will enable adjustment, insertion or removal of the arch wire in relation to the slot without necessity of removing the screw from the bracket. Moreover, the entire locking device of the present invention is conformable for use in securely locking arch wires of various sizes and shapes, and in each instance the locking member will apply a direct frictional force against the arch wire wedging it securely in place.

Accordingly, it is a consequent and principal object of the present invention to make provision for a novel and improved type of locking arrangement for use in association with orthodontic brackets and the like which is adaptable for wedging an arch wire securely in place notwithstanding variations or differences in size and shape, and in accomplishing the above will apply a direct wedging force against the arch wire to hold it securely against accidental release or loosening.

It is another object of the present invention to provide a locking device in association with an orthodontic bracket for locking arch wires and the like which enables ease of adjustment, insertion and removal of the arch wire in relation to the bracket without removing the locking means from the bracket, and moreover, where the arch wire can be rapidly and easily locked in place within the limited area of the mouth and held positively against accidental shifting, loosening or release.

It is an additional object to provide a locking screw for an orthodontic bracket which is capable of being readily used with conventional forms of orthodontic appliances, is greatly simplified in construction, economical to manufacture and highly efficient in use.

The above and other objects of the present invention will be made more apparent from the following detailed description taken together with the accompanying drawing, in which:

FIGURE 1 is a perspective view of a preferred embodiment of the locking device of the present invention.

FIGURE 2 is a vertical section view taken on line 2—2 of FIGURE 1; and

FIGURE 3 is an end view of the preferred form of locking device shown in FIGURES 1 and 2.

Referring to the drawing, there is shown for purposes of illustration in FIGURE 1 a fragmentary portion of a tooth band 10 having an orthodontic bracket 12 fixed to its outer surface, such as by means of solder or suitable weld, not shown. As an alternative, the bracket may include a relatively flat flange or plate portion which in turn is affixed to the tooth band, in accordance with conventional practice.

In the bracket of the present invention, the principal element is a locking screw 14 movable through threaded bore 15 and intersecting an arch wire receiving slot 16, a typical arch wire being designated in FIGURE 1 by numeral 18. In the following more detailed description, it will be seen that the arch wire 18 may assume a number of different forms and, for example, may be either generally rectangular or circular in cross section and further may be of a number of different sizes, this being illustrated in cross section by arch wires 18a and 18b in FIGURE 2. As a result, it is highly desirable to provide one standard type and size of bracket which will accommodate a number of different types and sizes of arch wires; nevertheless, the arch wire will be held securely in locked position within the bracket against accidental shifting, displacement or release therefrom.

In accordance with the above, the body of the bracket is preferably in the form of a generally cylindrical casing or body portion 20, the screw receiving opening 15 being centrally located therein and extending throughout the length of the casing, and the inner end of the casing being fixedly connected to the outer face of the tooth band. Specifically, the casing 20 is disposed with its longitudinal axis aligned in a generally horizontal direction when the tooth band is in attached relation on the tooth. The arch wire receiving slot 16 is passed through the wall of the casing and through the opening 15 at right angles or transverse to the longitudinal axis thereof and with terminal end surface 22 lying in horizontal relation along the bottom wall of the opening 15. Slides 24 of the slot are preferably straight-sided and, of course, are spaced apart sufficiently to accommodate an arch wire; in addition, the slot should be located in spaced relation to the ends of the casing to allow ample clearance for movement of the screw into and out of gripping engagement with the arch wire, as will be more fully described. As far as the relative disposition between the arch wire receiving slot and screw receiving opening is concerned, the most important consideration is that they be arranged transversely to one another and where the end of the slot terminates adjacent or at the side of the opening opposite the open end of the slot.

The principal feature of the present invention resides in the construction of the locking member 14, as well as the cooperative relationship between this locking member, the opening 15 and the slot 16. In order to provide for inward and outward adjustment of the locking member 14 in relation to the slot 16, it is preferably circular in cross section and conforms in size to the size of the opening 15 with threads 26 mating with threads 27, the latter extending throughout the length of the opening 15, except at the point of interruption by the slot. In accordance with well known practice, the outer end of the screw is provided with a recess 28 of polygonal cross section to receive a correspondingly shaped tool for rotation of the screw within the opening. As an obvious alternative, the end of the screw may be provided, if desired, with a screwdriver slot, although the illustrated form is preferred. To carry out the principal objectives of the present invention, the opposite end of the screw is generally wedge-shaped and this is preferably accomplished by tapering the end of the screw at an angle which is substantially at 45 degrees to the longitudinal axis of the screw and the opening and where the rounded end surface of the screw terminates in a pointed end 32.

Moreover, the tapered end 30 of the screw is preferably of a length equal, or substantially so, to the width of the arch wire receiving slot 16. In this way, when the arch wire is positioned within the slot 16 so as to rest against the terminal end surface 22, upon inward threading of the screw the tapered end surface will move into direct positive engagement with the arch wire, as best seen from FIGURE 2, with a portion of the tapered end overlying the arch wire so as to prevent its escape from the slot. In this relation, it will be noted that the tapered end surface moves into wedging engagement with the arch wire, forcing it against the corner formed between the terminal end 22 and one side 24, so that as the tapered end is caused to move inwardly in relation to the slot, it will apply a progressively increasing frictional pressure or force which acts directly through the center of the arch wire, not only preventing its accidental release from the slot but also preventing accidental longitudinal displacement in relation to the slot.

In use, the locking member 14 is considered to have particular utility and effectiveness in association with the preferred arrangement of the arch wire receiving slot 16 and screw receiving opening 15. For instance, the screw and bracket may be preassembled together with the tooth band for connection to the arch wire and to the tooth to be corrected, it being necessary only to insure that the pointed end 32 of the screw is adjusted outwardly so as to clear the slot 16 for insertion of the arch wire 18. Once the arch wire is placed in the slot against the terminal end surface, by inward threading of the screw the wedge-shaped end will move into positive, frictional engagement with the arch wire until it bears tightly against the wire to hold it in place against any longitudinal or outward movement. A high degree of force can be applied between the locking member and arch member due to the limited contact area therebetween and the gradually increased pressure exerted against the arch wire as the screw is threaded inwardly. Thus, the locking screw of the present invention would have utility not only with the particular bracket arrangement shown but with other arrangements as well, so long as the arch wire slot is intersected by the opening whereby the tapered end of the screw will bear against the arch wire and hold it firmly against the terminal end surface. If for any reason, in assembly, it is desirable or necessary to adjust the arch wire, the locking member may be threaded outwardly away from the arch wire a limited distance so as to permit the necessary adjustment; nevertheless, the pointed end of the screw will prevent accidental removal of the arch wire from the slot and this is particularly desirable while working in the limited area of the mouth. However, if desired to remove the arch wire from the slot without removal of the locking member, it is only necessary to continue outward threading of the locking member to a position where the pointed end thereof clears the side of the arch wire so as to permit its removal.

From the foregoing, it will be seen that there is provided in accordance with the present invention a greatly improved form of locking device, particularly adapted for use in orthodontic brackets for locking and securing arch wires and the like in place. The bracket assembly may be preassembled for ease of insertion of the arch wire, and the arch wire will be positively held against release, due to the configuration of the wedge-shaped end of the locking member and the manner in which force is applied against the arch wire to hold it against the terminal end surface. In this relation, the way in which the locking member cooperates with the particular form of slot and opening arrangement illustrated is also believed to be novel from the standpoint of providing ease of insertion, adjustment or removal of the arch wire without removing the screw member itself. Accordingly, it is to be understood that various modifications and changes in the preferred form of the present invention as described may be made without departing from the scope of the invention, as defined by the appended claims.

What is claimed is:

1. In an orthodontic bracket adapted to be attached by one end thereof to a tooth band substantially perpendicular thereto for supporting an arch wire in a required orientation with the tooth band, the bracket including a cylindrical body having a longitudinal threaded bore therethrough with an open slot intersecting said bore substantially perpendicular thereto, and a locking screw threadedly engaged in said bore having a tapered end face for engaging and locking said arch wire in said slot, the radial dimension of the screw being of a larger dimension than the maximum cross-sectional dimension of any arch wire being engaged; the improvement which comprises: a slot having an arch wire engaging surface substantially parallel to the axis of said bore, substantially tangential with the inner peripheral surface of said bore and constituting the bottom of said slot whereby an arch wire may be supported in said slot by being clamped therein between the bottom and band side of said slot and the tapered end face of said locking screw, the degree of taper of said tapered end face being substantially 45 degrees with respect to the longitudinal axis of the locking screw.

2. A bracket as defined in claim 1 wherein the slot is rectangular shaped and adjacent but spaced from the end of said bracket adapted to be attached to a tooth band thus permitting the tapered end face to extend through and beyond said slot upon clamping a small sized wire.

References Cited by the Examiner

UNITED STATES PATENTS

| | | | |
|---|---|---|---|
| 757,809 | 4/1904 | Houghton | 339—270 |
| 2,502,902 | 4/1950 | Tofflemire | 32—14 |

RICHARD A. GAUDET, *Primary Examiner.*